US012049729B2

(12) United States Patent
Catarino et al.

(10) Patent No.: US 12,049,729 B2
(45) Date of Patent: Jul. 30, 2024

(54) COMPOSTABLE SEAWEED-BASED COMPOSITIONS, AND ASSOCIATED SYSTEMS AND METHODS

(71) Applicant: Sway Innovation Co., Alturas, CA (US)

(72) Inventors: Matthew Catarino, Berkeley, CA (US); Julia Marsh, Berkeley, CA (US); Joakim Lars Georg Engstrom, Berkeley, CA (US); Matthew Joseph Mayes, Berkeley, CA (US)

(73) Assignee: SWAY INNOVATION CO., Alturas, CA (US)

( * ) Notice: Subject to any disclaimer, the term of this patent is extended or adjusted under 35 U.S.C. 154(b) by 0 days.

(21) Appl. No.: 18/441,941

(22) Filed: Feb. 14, 2024

(65) Prior Publication Data

US 2024/0183108 A1 Jun. 6, 2024

Related U.S. Application Data

(62) Division of application No. 18/052,875, filed on Nov. 4, 2022, now Pat. No. 11,939,724.

(60) Provisional application No. 63/276,448, filed on Nov. 5, 2021.

(51) Int. Cl.
*A01G 33/00* (2006.01)
*C08G 63/183* (2006.01)
*C08L 3/04* (2006.01)
*C08L 5/04* (2006.01)
*C08L 5/12* (2006.01)
*D21H 17/21* (2006.01)

(52) U.S. Cl.
CPC ............ *D21H 17/21* (2013.01); *A01G 33/00* (2013.01); *C08G 63/183* (2013.01); *C08L 3/04* (2013.01); *C08L 5/04* (2013.01); *C08L 5/12* (2013.01)

(58) Field of Classification Search
CPC ......... A01G 33/00; C08G 63/183; C08L 3/04; C08L 5/04
USPC ........................................................ 162/99
See application file for complete search history.

(56) References Cited

U.S. PATENT DOCUMENTS

| 5,654,103 | A  | 8/1997  | Troadec |
| 7,067,568 | B1 | 6/2006  | Ghosh et al. |
| 11,939,724 | B2 | 3/2024 | Catarino et al. |
| 2010/0272940 | A1 | 10/2010 | Shi et al. |
| 2013/0323368 | A1 | 12/2013 | Santos |
| 2022/0162424 | A1 | 5/2022 | Dundar Field |
| 2023/0128323 | A1 | 4/2023 | Piunova et al. |

FOREIGN PATENT DOCUMENTS

| CN | 107083045 B | 8/2017 | |
| KR | 20210061132 A | 5/2021 | |
| WO | WO-0248199 A2 * | 6/2002 | ............... A61K 8/73 |
| WO | 2020174234 A1 | 9/2020 | |
| WO | 2021101094 A1 | 5/2021 | |
| WO | 2022043691 A1 | 3/2022 | |
| WO | 2022167933 A1 | 8/2022 | |
| WO | 2022189782 A1 | 9/2022 | |
| WO | 2023131974 A1 | 7/2023 | |
| WO | 2024013518 A1 | 1/2024 | |

OTHER PUBLICATIONS

Chitra, et al., "Investigation of seaweed derivative iota-carrageenan based biopolymer electrolytes with lithium trifluoromethanesulfonate," Mater. Res. Express 2020, 7, 015309.
Dungani, et al., "Reinforcing Effects of Seaweed Nanoparticles in Agar-based Biopolymer Composite: Physical, Water Vapor Barrier, Mechanical, and Biodegradable Properties," BioResources 2021, 16(3), 5118-5132.
Hasan, et aL, "Enhancement in the Physico-Mechanical Functions of Seaweed Biopolymer Film via Embedding Fillers for Plasticulture Application-A Comparison with Conventional Biodegradable Mulch Film," Polymers 2019, 11, 210.
International Search Report and Written Opinion mailed Mar. 15, 2023 for International Patent Application No. PCT/US2022/079337, 12 pages.
Marium, et al., "Production of Bio-Degradable Carrageenan-Based Films From Soueria Robusta (Red Bamboo) of Karachi Coast By Using Glycerol and Sorbitol," International Journal of Biology and Biotechnology 2021, 18(1), 65-72.
Puscaselu et al., "The antibacterial properties of seaweed biopolymer based films incorporated with essential oils," Journal of Argoalimentary Processes and Technologies 2017, 23(3), 157-163.
Rizal, et al., "Enhanced Functional Properties of Bioplastic Films Using Lignin Nanoparticles from Oil Palm-Processing Residue," Polymers 2022, 14, 5126.

(Continued)

*Primary Examiner* — Deve V Hall
(74) *Attorney, Agent, or Firm* — Perkins Coie LLP

(57) ABSTRACT

Compostable seaweed-based compositions, and associated systems and methods are disclosed herein. In some embodiments, the seaweed-based composition comprises (i) a phycocolloid including agar, alginate, carrageenan, and/or unprocessed seaweed, (ii) a polymer comprising thermoplastic starch (TPS), polycaprolactone (PCL), polylactic acid (PLA), polyhydroxyalkanoates (PHA), polyesteramide (PEA), polybutylene adipate terephthalate (PBAT), polybutylene succinate (PBS), and/or polyvinyl alcohol (PVOH), and (iii) an additive, wherein the phycocolloid comprises no more than 90 wt % of the seaweed-based composition, the biopolymer comprises no more than 80 wt % of the seaweed-based composition, and the additive comprises no more than 50 wt % of the seaweed-based composition.

20 Claims, 4 Drawing Sheets

(56) References Cited

OTHER PUBLICATIONS

Seeta Uthaya Kumar, et al., "Extracted Compounds from Neem Leaves as Antimicrobial Agent on the Physico-Chemical Properties of Seaweed-Based Biopolymer Films," Polymers 2020, 12, 1119.
Examination Report mailed May 30, 2024 in Australian Patent Application No. 2022379958, 4 pages.

* cited by examiner

COMPOSTABLE SEAWEED-BASED COMPOSITIONS, AND ASSOCIATED SYSTEMS AND METHODS

CROSS-REFERENCE TO RELATED APPLICATIONS

The present application is a divisional of U.S. patent application Ser. No. 18/052,875, filed Nov. 4, 2022, which claims the benefit of U.S. Provisional Application No. 63/276,448, filed Nov. 5, 2021, the disclosures of which are incorporated herein by reference in their entireties.

TECHNICAL FIELD

This present disclosure relates to compostable seaweed-based compositions, and associated systems and methods.

BACKGROUND

Single-use plastic packaging is the most inexpensive, lightweight, durable, scalable material on earth, but it is made from petroleum, a finite resource that is environmentally damaging and lasts for centuries in landfills and in nature. The global population of more than 7 billion people produced over 320 million tons of plastic in 2016 alone, which is set to double by 2034. Rising consumer and investor awareness around plastic pollution, along with increasing governmental restrictions on single-use plastics, are forcing major brands and manufacturers to actively seek sustainable replacements. Accordingly, there exists a need for alternative packaging solutions.

BRIEF DESCRIPTION OF THE DRAWINGS

Features, aspects, and advantages of the presently disclosed technology may be better understood with regard to the following drawings.

DETAILED DESCRIPTION

Figure 1:
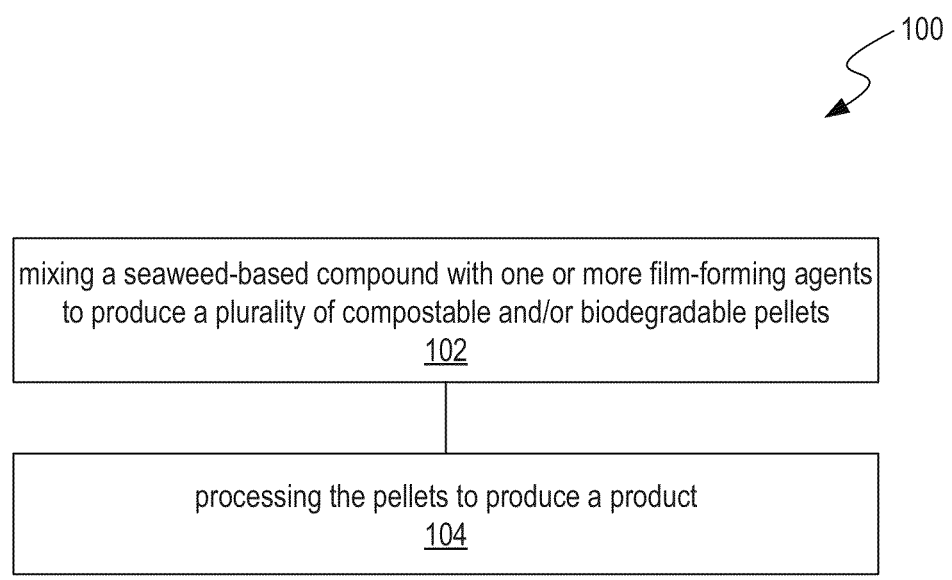
FIG. 1 is a flow diagram of a method for producing a seaweed-based composition, in accordance with embodiments of the present technology.

Aspects of the present disclosure are directed generally to compostable seaweed-based compositions, and associated methods and systems. Specific details of several embodiments of the present technology are described herein with reference to FIGS. 1-4. The present technology, however, can be practiced without some of these specific details. In some instances, well-known structures and techniques often associated with twin-screw extrusion and blown film extrusion, have not been shown in detail so as not to obscure the present technology. Moreover, although many of the embodiments are described below with respect to systems and methods for creating thin film plastic-like material from seaweed-based materials via blown film extrusion, other applications and other embodiments in addition to those described herein are within the scope of the technology. For example, one of ordinary skill in the art will understand that one or more aspects of the present technology are applicable to creating other substrates and/or packaging materials with seaweed-based materials and/or using other types of processing methods, such as cast film extrusion, tubing extrusion, over jacketing extrusion, coextrusion, extrusion coating, and/or other suitable material processing methods.

The terminology used in the description presented below is intended to be interpreted in its broadest reasonable manner, even though it is being used in conjunction with a detailed description of certain specific embodiments of the disclosure. Certain terms can even be emphasized below. However, any terminology intended to be interpreted in any restricted manner will be overtly and specifically defined as such in this Detailed Description section.

In the Figures, identical reference numbers identify generally similar, and/or identical, elements. The features shown in the Figures are schematic and thus merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

I. Overview

Petroleum-based, single-use plastic packaging lasts for hundreds of years in landfills, and has created the need for more sustainable solutions. The most popular alternatives currently are bioplastics derived from corn and sugarcane. However, these bioplastics are often (i) dependent on monoculture crops, (ii) combined with traditional plastics or petroleum-based agents (e.g., polybutylene adipate terephthalate (PBAT)), and (iii) require commercial composting facilities to degrade them. If not disposed of properly, these alternatives to traditional plastics can take hundreds of years to degrade and thus occupy valuable space in waste facilities.

Other bioplastic materials that are biodegradable have been attempted, but do not meet the standards for a home compostable, marine safe, thin film flexible packaging material. Additionally, many of these other bioplastic materials are dependent on resource-intensive inputs, produce large amounts of waste, compete with food crops, and still rely on petroleum-based binding agents. For example, degrading corn-based packaging requires treatment at industrial composting facilities at temperatures of at least 140° F. Without these facilities and/or thermal processing, degrading these types of packaging can take over 100 years to degrade naturally. As such, corn-based bioplastics still produce significant waste that pollutes systems on land and at sea.

Embodiments of the present disclosure attempt to address at least some of the above-described issues by using seaweed and biodegradable materials to form film products, all or a portion (e.g., at least 80%, 90%, or 95%) of which can degrade naturally (e.g., with or without industrial facilities and/or thermal processing) over a relatively short period of time (e.g., less than 45 days, less than 2 months, less than 4 months, less than 6 months, or less than 1 year). For example, in some embodiments, the film product can be industrially compostable, or home compostable, e.g., as defined by ISO-14855, ASTM D6400, Australian standard AS 5810-2010, European standard EN 13432:2000, TUV Austria certification, and/or biodegradable products institute (BPI) certification.

As described herein, the present technology includes methods and systems for producing seaweed-based compositions, and can include mixing in a processor (e.g., via twin-screw extrusion or reaction extrusion) a seaweed-based compound with one or more film-forming agents (e.g., polymers, plasticizers, thermal stabilizers, viscosity enhancers) to produce a plurality of compostable and/or biodegradable pellets and/or seaweed-based compositions. The pellets can be subsequently processed, e.g., via blown or cast film extrusion ("film extrusion"), to produce flexible films and/or other substrates that can be used to form film-forming packaging products (e.g., retail bags, poly bags, bubble wrap, polymailers, pouches, wrappers, and the like), which can replace the single-use plastic packaging. By forming these end products from seaweed and/or biodegradable materials and combining the materials in a manner that enables them to be processed (e.g., via blown film extrusion), products formed via embodiments of the present technology can be home compostable, nontoxic, and/or marine safe. Moreover, such products can biodegrade within months in a compost environment into nutrients that promote healthy soil and without the need for industrial processing. In such embodiments, the compost environment is defined by characteristics including aeration or aerobic conditions, moisture content (e.g., between 50-60%), temperature (e.g., less than 50° C.), and carbon:nitrogen ratio (e.g., a ratio between 20-30). Additionally, embodiments of the present technology have desirable characteristics for use in flexible film packaging, including tensile strength, heat-scalability, transparency, impact resistance, moisture resistance, strain at break, density, heat resistance, and flexible durability, amongst other characteristics.

II. Seaweed-Based Composition, and Associated Methods and Systems

FIG. 1 is a flow diagram of a method 100 for producing a seaweed-based composition, in accordance with embodiments of the present technology. The method 100 can include mixing a seaweed-based compound with one or more film-forming materials or agents ("agents") to produce a plurality of compostable and/or biodegradable pellets ("pellets") (process portion 102). The mixing can include extrusion or compounding via one or more extruders (e.g., a single or twin-screw extruder) as explained herein, and can occur in a continuous or batch manner.

The seaweed-based compound can comprise hydrocolloids and/or phycocolloids, which as used herein can be interpreted to include processed seaweed, extracted phycocolloids (e.g., agar, alginate, ulvan, and/or carrageenan (e.g., kappa, iota, and/or lambda)). In some embodiments, the phycocolloids can include unprocessed seaweed (e.g., cut giant kelp or milled kappaphycus), dry seaweed powder, and/or chemically-modified phycocolloids, as described herein. The chemically-modified phycocolloids can include seaweed that undergoes pre-processing prior to mixing with the agents, e.g., to make the seaweed more suitable for downstream thermal processing (e.g., compounding and/or extrusion). For example, such seaweed can undergo modification including polymerization, esterification, polyester grafting, acetylation, hydroxypropylation, and/or carboxymethylation. In such embodiments, the chemically-modified phycocolloid can include an ester functional group, a polyester functional group, an acetyl functional group, a hydroxypropyl functional group, and/or a carboxymethyl functional group. Additionally or alternatively, in such embodiments, hydroxyl groups can be altered on the polysaccharide structure of the seaweed and/or be replaced, e.g., with esters or other groups, to make the structure more thermoplastic, and thus obtain a more desirable melting profile and/or viscosity, among other beneficial characteristics. The chemically-modified phycocolloids can be formed by reacting a base phycocolloid (i.e., unprocessed phycocolloids, agar, alginate, and/or carrageenan) with molecules susceptible to ester bond formation and polyester grafting in bulk or water solutions at predetermined temperatures (e.g., at least 100° C., 110° C., 120° C., or 130° C. The produced chemically-modified phycocolloid can include the base phycocolloid and the modifying molecule(s) (e.g., a polymer compound). The modifying molecule(s) are susceptible to ester bond formation and polyester grafting, and can comprise caprolactone, glycolic acid, lactic acid, lactide, acetic anhydride, ethyl lactate, lecithin, unsaturated fatty acids, saturated fatty acids, acetyl chloride, succinic acid, ethyl acetate, adipic acid anhydride, and/or propylene oxide.

The seaweed-based compound can include a protein content of at least 0.1%, at least 3%, at least 5%, at least 8%, at least 10%, at least 15%, at least 20%, at least 30%, at least 40%, or within a range of 0.1-40%, 0.1-15%, 3-40%, 5-40%, 10-30%, or 15-30% by weight. Certain seaweeds (e.g., extracted phycocolloids) tend be relatively low in protein content (e.g., less than 0.1% or 2% by weight) and relatively high in carbohydrate content (e.g., structural carbohydrates and/or storage carbohydrates such as starch) which, unless chemically modified, can be relatively stiff with high melting and glass transition temperatures, may not behave like thermoplastic polymers, and can be thermally sensitive such that they are prone to burning, e.g., when undergoing coloration, Maillard and/or caramelization reactions. As a result, such seaweeds with relatively lower protein content can be more difficult to use as an input for thermal processing (e.g., via blown film extrusion) or processing may be difficult (e.g., require more time, additional steps, tighter tolerances) without introducing the agents disclosed herein. For example, when processed, the lower protein content seaweed may not be able to form the optimal viscosity needed to make blown film extrusion of the pellets successful or possible.

Without being bound by theory, seaweed with a relatively high protein content can enable the end product of embodiments disclosed herein to have better tensile strength, elongation, and impact strength, all of which are beneficial flexible film packaging characteristics. Moreover, seaweed with relatively high protein content can have higher levels of bioavailable nitrogen and phosphorous, which, when used with the polymers disclosed herein, can enhance the rate at which biodegradation of the end product occurs. As a result, utilizing seaweed with higher protein content can enable biodegradation in non-industrial and other environments, such as the compost environments described previously. The relatively high protein content can also enable the seaweed to be more processable, such that the seaweed is more flexible and responds better to thermal processing relative to seaweed that has a lower protein content. By altering the seaweed prior to mixing with the agents and/or using higher protein seaweed, embodiments of the present technology can enable formation of pellets and an end product with more desirable characteristics. Embodiments of the present technology overcome some of the challenges of using unprocessed seaweed (e.g., the above-mentioned coloration reactions and unwanted cross-linking) by processing the seaweed-based compounds disclosed herein at elevated temperatures. In some embodiments, higher protein seaweed can have a glass transition temperature lower than a thermal degradation temperature of the higher protein seaweed, thereby enabling the seaweed material to soften and flow better during extrusion. The glass transition temperature, thermal degradation temperature, and related characteristics of the seaweed can be measured via thermogravimetric analysis (TGA) and/or differential scanning calorimetry (DSC) analysis.

It is worth noting that utilizing phycocolloids comprising unprocessed seaweeds can make processing more difficult and/or lead to undesirable characteristics in the end product, and thus prevent their use. For example, unprocessed seaweeds can generate unwanted coloration reactions that make the end product/film less transparent and/or unwanted cross-linking that make the end product/film more brittle at elevated temperatures. Embodiments of the present technology are able to overcome these deficiencies based on a unique composition or combination of the seaweed-based compound and agents, and processing the unique composition at predetermined melt-processing temperatures.

The agents can include at least one of a compostable resin, biodegradable polymer, or biopolymer (collectively referred to herein as "polymer"). The term biopolymer as used herein should be interpreted based on the definition provided by the IUPAC, Compendium of Chemical Terminology, 2nd edition. Additionally or alternatively, the agents can include a plasticizer, a viscosity enhancer, a cross linker, a slip agent, an anti-block additive, an antioxidant, a thermal stabilizer, a processing aid, an odor absorber, and/or other materials (collectively referred to herein as "additives") configured to enable or better enable the pellets to be processed (e.g., via film extrusion). The combination of the agents and/or additives can enable the seaweed-based compounds to be formed into pellets or seaweed-based compositions that are suitable for subsequent processing via film extrusion. Previously, seaweed-based compositions have been ineffective in creating usable flexible film packaging in part because the seaweed could not be processed in a manner that produced the characteristics needed for flexible film packaging. For example, seaweed-based raw materials can be prone to coloration, cross-linking, charring and/or burning which prevents production of usable flexible film via blown or cast film extrusion. Additionally or alternatively, seaweed-based raw materials, when mixed, may not have the right viscosity or semi-crystalline structure, which as discussed elsewhere herein can also inhibit proper processing via film extrusion. As such, the combination of the agents with the seaweed-based compounds, as disclosed herein, can enable the resulting pellets to have the appropriate material properties that enable processing via film extrusion and the production of films.

The polymer can include polyesters, a polycaprolactone (PCL), polylactic acid (PLA), polyhydroxyalkanoates (PHA), polyesteramide (PEA), polybutylene adipate terephthalate (PBAT), polybutylene succinate (PBS), thermoplastic starch (TPS), and/or polyvinyl alcohol (PVOH). In some embodiments, the polymer is the individual material most responsible for defining the viscosity of the pellets, which can enable the seaweed-based compound and/or the additives other than the polymer to be accepted by (e.g., properly mixed with) the polymer. For example, the polymer can provide for more desirable melting of the phycocolloid and therein more uniform blending of the polymer with the phycocolloid and/or a more uniform distribution of particles of the phycocolloid throughout the polymer.

Other agents can include a substance that is added to a material to make it softer and/or more flexible to increase its plasticity, decrease its viscosity, or decrease friction during its handling in manufacture. The plasticizer of the agents or additives can include a hydrophilic plasticizer, a hydrophobic plasticizer, glycerin, polyglycerin, polyglyceride fatty acid esters, guar gum, sorbitol, tributyl citrate, ethylene glycol, water, and/or propylene glycol. The viscosity enhancer can include a copolymer of styrene, methyl methacrylate and glycidyl methacrylate, and/or a terpolymer (e.g., ethylene-acrylate terpolymer). The viscosity enhancer can provide for a consistent and stable viscosity to enable a desirable melt flow profile of the resulting pellets across a wide range of temperatures, which can help ensure the pellets can be further processed, e.g., via film extrusion. The cross linker can include an additive which links two polymer chains via a covalent or ionic bond, and can include calcium chloride, calcium bromide, calcium fluoride, magnesium chloride, magnesium bromide, and/or magnesium fluoride. The slip agent can include products which can be added to polymers to control friction, and can include a plant-based slip agent, crucamide, oleamides, oleyl palmitamide, stearyl erucamide, behenamide, stearamide, ethylene bis-oleamide, and/or ethylene bis-stearamide. The anti-block additive of the additives can provide a barrier that limits contact between adjacent plastic film surfaces, and can include inorganic minerals (e.g., calcined kaolin, cristobalite, precipitated silica, diatomaceous earth, mica, talc, calcium carbonate, calcium sulfate (anhydrite), magnesium carbonate, magnesium sulfate, feldspar, and/or titanium dioxide) and/or organic alternatives (e.g., amides, fatty acid amides, fatty acids, salts of fatty acids, and/or silicones). The odor absorber of the additives can neutralize industrial odors and/or limit harmful emissions. The odor absorbers can include vanillin, copper chlorophyllin, spearmint, essential oils, and/or an inorganic antimicrobial additive. In some embodiments, the additives do not include low density polyethylene (LDPE), high density polyethylene (HDPE), polyethylene terephthalate (PET), polystyrene (PS), or other petroleum-based products. The additives can also include other bio-based materials, such as cassava starch, hemp, flax, rice, and/or sugar. These bio-based materials can, among other qualities, improve properties of the pellets for processing, lower the corresponding carbon footprint, and/or improve nutritional value of the resulting end product after natural or industrial degradation.

The pellets or seaweed-based composition can comprise different weight percentages of the seaweed, polymer and additives to produce predetermined characteristics in the end product (e.g., a film). For example, the seaweed-based composition can comprise (i) a phycocolloid content of 10-90%, 10-80%, 10-60%, 10-50%, 20-60%, or 20-40%, (ii) a polymer or biopolymer content of 0-90%, 0-80%, 50-90%, or 50-80%, and/or (iii) an additive content of 0-50%, 1-50%, 2-50%, 10-50%, 0.5-2%, or 1-2%. In some embodiments, the seaweed-based composition comprises 60-70% agar and 30-40% of the additives. In some embodiments, the seaweed-based composition comprises 80% agar and 20% biopolymer or PBAT. In some embodiments, the seaweed-based composition comprises 10-40% agar, 20-80% biopolymer or PBAT, and 10-40% additive. In some embodiments, the seaweed-based composition comprises 10-40% agar, 50-90% biopolymer or PBAT, and 0.5-3% tributyl citrate.

The pellets or seaweed-based composition can comprise varying protein, carbohydrates, and minerals content. For example, the seaweed-based composition can comprise (i) a protein content of 0.1-25%, 0.1-20%, 0.1-15%, or 5-15%, (ii) a carbohydrate content of at least 30%, 40%, 50%, 60%, 70%, 80%, 90%, or 95%, and (iii) a mineral content of 0.1-40%, 0.1-30%, or 0.1-25%.

The mixing of the seaweed-based compounds and the agents can include continuous compounding or reaction extrusion via a mixer or extruder (e.g., a twin-screw extruder). In such embodiments, the extruder can shear the seaweed-based compound and the additives to form a blend that is substantially homogenous. The rate of shearing can be set to be no more than a predetermined shear rate, e.g., to ensure that the seaweed-based compound and/or the additives (e.g., the polymer) are not overly sheared, which can diminish the ability of the resulting mixture to be processed (e.g., via film extrusion) and produce usable end products. Shear rate is dependent upon the dimensions of the extruder (e.g., 1 inch extruder, 2 inch extruder, 3 inch extruder, 4 inch extruder, etc.), rotational speed, and/or viscosity of the polymer of the additive, which may be further dependent on other factors (e.g., temperature). In some embodiments, the rotational speed can be 500-800 revolutions per minute (rpm) for a 0.5-1 inch extruder, 100-1000 rpm for a 1-2 inch extruder, 200-1200 rpm for a 2-3 inch extruder, or 300-1600 RPM for a 3-4 inch extruder.

A twin-screw extruder (e.g., a co-rotating twin-screw extruder, a counter-rotating twin-screw extruder) enables the shear rate to be controlled, such that different feed materials can be sheared via the same extruder at different rates, e.g., to inhibit agglomerate formation and/or enhance efficiency. For example, when using a twin-screw extruder, (i) the non-shear or less-shear sensitive materials (e.g., the polymer) can be added to a feed throat (e.g., a primary input) of the extruder where they can be exposed to higher shear mixers (and higher temperatures) to produce a consistent and lower viscosity melt flow, and (ii) the more-shear sensitive materials (e.g., the seaweed and other additives) can be added downstream of the feed throat (e.g., via side feeders or a secondary input of the extruder) where they can be exposed to lower shear mixers (and lower temperatures).

The mixing of seaweed-based compound and the agents can be done at a predetermined temperature to optimize mixing and material properties of the resulting mixture or pellets. For example, it can be desirable to mix the phycocolloid and agents at elevated temperatures to enable more effective and efficient mixing, but below a thermal degradation temperature that will degrade the materials and thereby diminish the ability of the resulting mixture to be processed (e.g., via film extrusion) and produce usable end products (e.g., flexible films). As such, it is generally desirable to thermally process the seaweed-based compound and agents at as high a temperature as possible without thermally degrading them, as this lessens the viscosity of the resultant mixture while avoiding charring or burning. The low viscosity is desirable because it enables processing (e.g., in an extruder) for longer periods of time at more efficient conditions, as the processing device can have lower head pressure and/or lower torque, among other beneficial operating conditions. In some embodiments, mixing of the seaweed-based compound and additives includes extruding via blown film extrusion, e.g., at a temperature no more than a predetermined thermal degradation temperature (e.g., 130° C., 150° C., 165° C., 180° C., 200° C., or within a range of 90-200° C., 150-200° C., 165-200° C., or 180-200° C.

Different materials of the agents and seaweed-based compound can have different thermal degradation temperatures, and thus can be thermally processed individually, e.g., in different stages or areas of the mixer or extruder, depending on their individual predetermined thermal degradation temperature. For example, the seaweed-based compound and/or some of the agents can have a thermal degradation temperature around 200° C. and a preferred thermal processing temperature range of 90-200° C., and the polymer can have a thermal degradation temperature around 300° C. and a preferred thermal processing temperature range of 200-300° C. As such, in some embodiments, mixing the seaweed-based compound and the agents can include mixing the polymer of the agents in an upstream portion of the mixer or extruder (e.g., adjacent a feed throat or primary input) at a first temperature (e.g., between 200-300° C.) to form a material blend, and then mixing the material blend with the seaweed and other agents in a downstream portion of the mixer or extruder (e.g., at the extrusion barrel or adjacent the side feeder) at a second temperature (e.g., between 90-200° C.) less than the first temperature. Mixing the seaweed-based compound and agents in such a manner can provide multiple advantages. For example, mixing the polymer at an elevated temperature upstream of the seaweed-based compound and rest of the agents can enable the polymer to achieve a desirable polymer viscosity or melt flow rate (e.g., a melt flow index (MFI) of at least 0.01 grams/10 min), which can further enable the polymer to accept (i.e., be mixed with) the other agents, such as particulate fillers and/or additional seaweed-based compounds. The MFI can be defined as the mass (grams) of material able to flow in ten minutes through a capillary of a specific diameter and length by an applied pressure. If the particulate fillers were added to a polymer having a lower viscosity or melt flow rate (e.g., an MFI less than 0.01 grams/10 min), the particulate fillers may not be homogeneously distributed within the polymer, which could undesirably affect the ability of the polymer to be processed downstream (e.g., via film extrusion). MFI can be tested via a melt flow indexer and/or per ASTM D1238 or ISO 1133.

The pellets produced via the mixing of the seaweed-based compound and the additives can have a cylindrical or disc shape, a size of 1-5 mm, and/or a moisture content less than 50% by weight. Additionally or alternatively, the pellets can be configured to be subsequently processed in a blown or cast film extruder ("film extruder"). In such embodiments where the pellets are configured to be processed in a film extruder, the pellets may not be configured to be processed via other manufacturing techniques, such as cast film extrusion or injection molding. For example, the production of the pellets via the mixing of the seaweed-based compound and agents is controlled such that one or more material properties of the pellet, including the rheology, molecular weight, melting behavior, and cooling behavior, among other properties, are within particular ranges that enable the pellets to be appropriately processed downstream (e.g., via film extrusion). For example, in some embodiments, the pellets can have a polydispersity index (PI) of at least 2 or between 1 and 3, wherein the PI is defined as the ratio of the weight average molecular weight of the pellets to the number average molecular weight of the pellets. PI can be determined using electron micrographs and/or instruments that use dynamic light scattering or gas phase chromatography (GPC). As another example, the pellets can have a particular melt flow behavior or MFI. In some embodiments, the MFI (e.g., according to ASTM 1238) for the pellets is relatively flat across a range of temperatures the pellets are to be processed at. For example, the MFI for the pellets across a temperature range of 160-180° C. can vary by no more than 10 g/10 min, no more than 8 g/10 min, no more than 6 g/10 min, or no more than 3 g/10 min. Additionally or alternatively, the MFI for the pellets at 160° C. can be 1-15 g/10 min, the MFI for the pellets at 170° C. can be 5-20 g/10 min, and the MFI for the pellets at 180° C. can be 10-25 g/10 min, wherein the difference between MFI at each of these temperatures is no more than 5 g/10 min, no more than 4 g/min, no more than 3 g/10 min, no more than 2 g/10 min, or no more than 1 g/10 min. In this same regard, the pellets can have a semi-crystalline structure, as opposed to a crystalline or amorphous structure, which can enable the subsequent film extrusion to be successful, e.g., by cooling and crystallizing in a timely manner (i.e., not too fast or too slow). Stated differently, if the pellets do not have a semi-crystalline structure, then the pellets may not be processable during film extrusion to form a usable end product or flexible film. For example, if the pellets are too amorphous, they will not crystallize and/or cool quickly enough during film extrusion, and if the pellets are too crystalline they will be too rigid and will not blow.

As shown in FIG. 1, the method 100 can further include processing the pellets to produce a product (process portion 104). Processing can include extruding the pellets via film extrusion, e.g., at a temperature no more than the thermal degradation temperature (e.g., 160° C., 170° C., 180° C., 190° C., 200° C., and/or temperatures therebetween) of the pellets or the individual materials of the pellets having the lowest thermal degradation temperature. Processing the pellets below the thermal degradation temperature can ensure the pellets do not char or burn during extrusion and create overly crystallized or degraded polymer point defects. The product can have a composition of at least 10% seaweed, at least 20% seaweed, at least 30% seaweed, at least 40% seaweed, at least 50% seaweed, at least 60% seaweed, at least 70% seaweed, at least 80% seaweed, at least 90% seaweed, and/or seaweed percentages therebetween (e.g., 10-90%), and can include a flexible film that is transparent, heat-scalable, and/or foldable. An increased seaweed content of the product can be directly correlated with improved biodegradability, improved ability for home composting, and overall regenerative nature of the product. The product can be biodegradable per ISO 14855 and/or configured to degrade over a period of no more than 1 month, 2 months, 3 months, 4 months, 5 months, or 6 months, e.g., in a home compostable environment. Additionally or alternatively, the product can have a density of at least 0.5 g/cm$^3$, 1.0 g/cm$^3$, 1.5 g/cm$^3$, or within a range of 0.5-1.5 g/cm$^3$.

The product can have a tensile strength (e.g., accordingly to ASTM D882) of at least 10 megapascals (MPa), 15 MPa, 25 MPa, 30 MPa, 35 MPa, 40 MPa, 45 MPa, 50 MPa, or within a range of 10-50 MPa, 30-50 MPa or 35-45 MPa. Tensile strength can be measured via electromechanical testing machines manufactured by Instron of Norwood, Massachusetts, e.g., as defined by ASTM D882 and/or ISO 527. Tensile strength of at least 30 MPa for flexible film packaging, including packaging that is home compostable, can help ensure the packaging can support additional loads without rupturing or tearing.

The product can have a strain at break (e.g., accordingly to ASTM D882) of at least 50%, 60%, 70%, 80%, 90%, 100%, 200%, 300%, 400%, 500%, or within a range of 50-500%. Strain at break can be measured via electromechanical testing machines manufactured by Instron of Norwood, Massachusetts, e.g., as defined by ASTM D882 and/or ISO 527. A strain at break of at least 100% for flexible film packaging, including packaging that is home compostable, can help ensure the packaging can withstand sufficient stretching without deforming plastically.

The product can have a stiffness or modulus (e.g., according to ASTM D882) of at least 25 MPa, 30 MPa, 50 MPa, 75 MPa, 100 MPa, 125 MPa, 150 MPa, 175 MPa, 200 MPa, 300 MPa, or within a range of 25-300 MPa. Stiffness or modulus can be measured via electromechanical testing machines manufactured by Instron of Norwood, Massachusetts, e.g., as defined by ASTM D882 and/or ISO 527. A stiffness or modulus of at least 100 MPa for flexible film packaging, including packaging that is home compostable, can help ensure the packaging can withstand sufficient withstand excess plastic deformation to the point of fracturing.

The product can have a moisture vapor transmission rate (WVTR) of no more than 1000 g/m$^2$/day, 500 g/m$^2$/day, 250 g/m$^2$/day, 100 g/m$^2$/day, 50 g/m$^2$/day, 25 g/m$^2$/day, 10 g/m$^2$/day, or within a range of 10-1000 g/m$^2$/day. WVTR can be measured via a MOCON WVTR Permeation Analyzer, e.g., as defined by ASTM F1249 and/or ISO 15106-2. A WVTR less than 10 g/m$^2$/day for flexible film packaging, including packaging that is home compostable, can help ensure water vapor permeation through the packaging is sufficiently limited, e.g., to not damage package contents.

In some embodiments, the product is a flexible film or roll of flexible film which may be further processed into other products, such as shopping bags, poly bags, bubble wrap, polymailers, pouches, or wrappers.

In some embodiments, process portion 104 is omitted from the method 100 or is performed by a different actor. For example, in some embodiments, the method 100 only includes producing the pellets (via process portion 102), which are then provided to other manufacturers in the supply chain for further processing.

Figure 2:
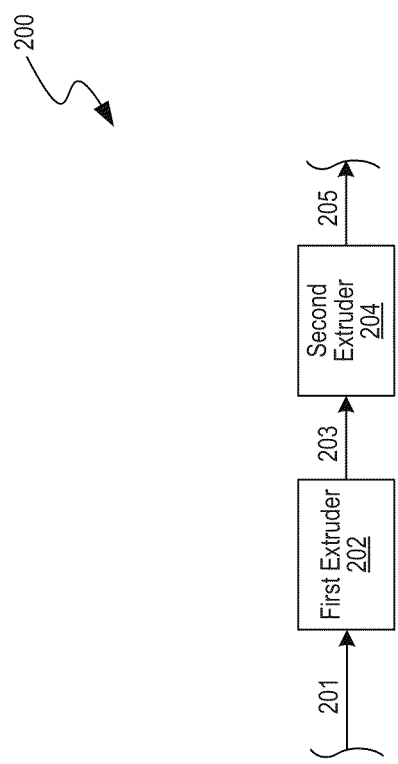
FIGS. 2-4 are schematic block diagrams of systems for producing a seaweed-based composition, in accordance with embodiments of the present technology A person skilled in the relevant art will understand that the features shown in the drawings are schematic and for purposes of illustrations, and variations, including different and/or additional features and arrangements thereof, are possible.

FIG. 2 is a schematic block diagram of a system 200 for producing a seaweed-based composition in accordance with embodiments of the present technology. The system 200 can include a first extruder 202 (e.g., a twin-screw extruder) configured to receive and process a feed 201. The feed 201 can include the seaweed-based compound and the agents described herein with reference to FIG. 1. For example, the feed 201 can include the seaweed-based compound and the agents described with reference to FIG. 1.

In some embodiments, the first extruder 202 can be configured to thermally process (e.g., via compounding or extrusion) different materials of the feed 201 at different temperatures, e.g., to ensure the individual materials are not thermally degraded (e.g., charred or burned) by the first extruder 202. As an example, the first extruder 202 can include a first processing area (e.g., adjacent the feed throat) configured to receive the polymer of the feed 201 and mix the polymer at a first temperature (e.g., no more than 300° C.). The polymer can have a thermal degradation temperature of around 300° C., which may be higher than the thermal degradation temperature of the other materials of the feed 201. It can be advantageous to process (e.g., shear) the polymer separately from other materials and at the first temperature, such that the polymer has a more desirable viscosity, e.g., that is more able to be later mixed with the seaweed-based compound and the other agents. That is, by mixing the polymer at the first temperature to create a polymer with a more desirable viscosity, the polymer can better accept the seaweed-based compound and other agents that are later added. The first extruder 202 can also include a second processing area (e.g., adjacent the side feeders), downstream of the first processing area, wherein the mixed polymer having the desirable viscosity is combined with the seaweed-based compound and other agents at a second temperature (e.g., no more than 200° C.). less than the first temperature. The first extruder 202 can produce a mixed outlet 203 including a plurality of pellets. The pellets can include any of the pellets described elsewhere herein, e.g., with reference to FIG. 1.

The system 200 can further include a processor or second extruder 204 (e.g., a film extruder) configured to receive the mixed outlet 203 and produce a product 205. The processor or second extruder can convert rolls produced via the first extruder by slitting, folding, printing, die cutting, and/or heat sealing. The product 205 can include retail bags, poly bags, bubble wrap, mailers, pouches, wrappers, or any other products described elsewhere herein.

Figure 3:
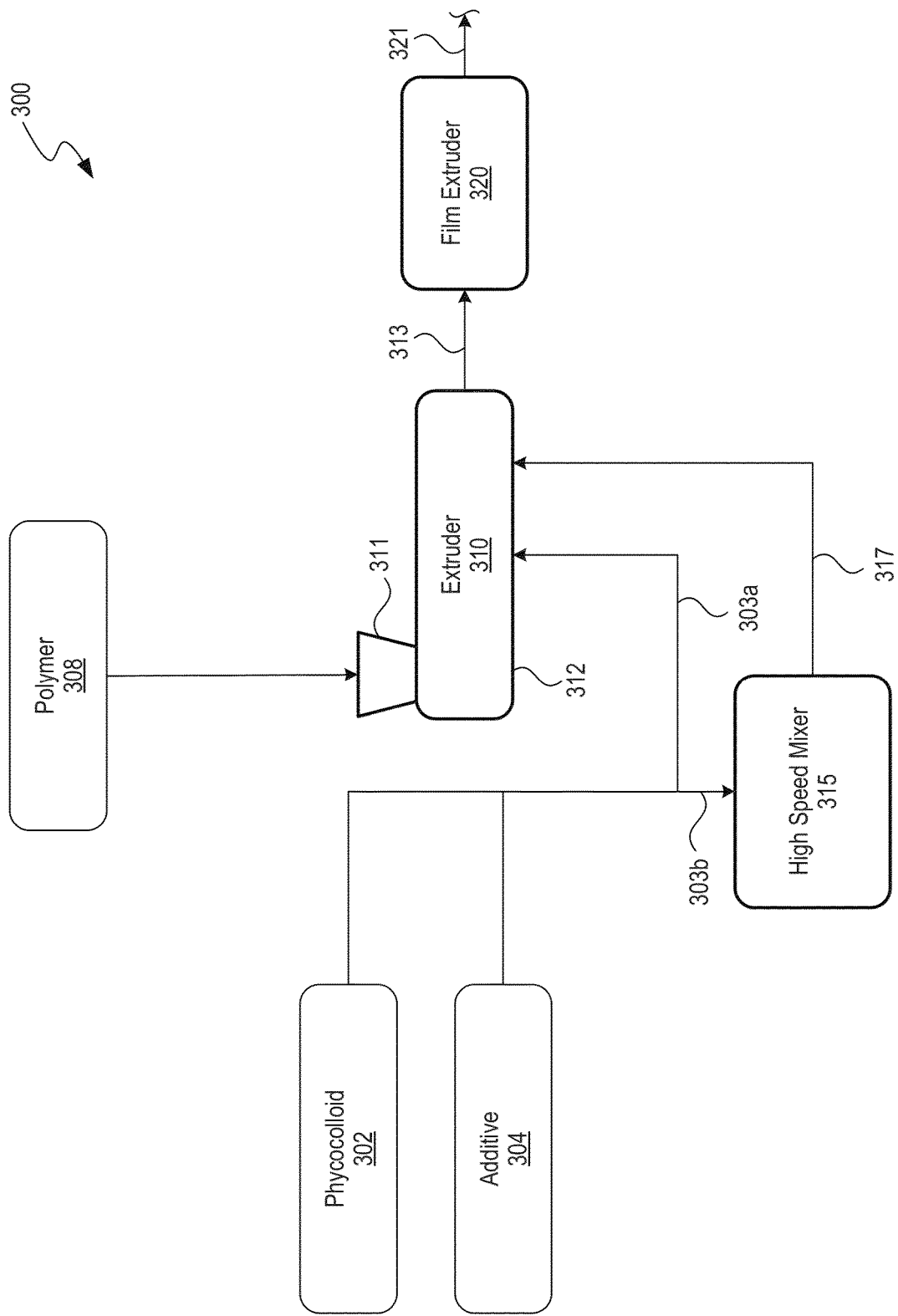

FIG. 3 is a schematic block diagram of a system 300 for producing a seaweed-based composition, in accordance with embodiments of the present technology. The system 300 can include a source of a phycocolloid 302, a source of an additive 304, a source of a polymer 308, and an extruder or mixer 310 ("extruder 310") configured to receive each of the phycocolloid 302, the additive 304 and the polymer 308 and produce a pellet or seaweed-based composition 313 ("seaweed-based composition 317"). The extruder 310 can receive the phycocolloid 302 and the additive 304 individually in separate streams or as a combined stream. The phycocolloid 302, additive 304, and polymer 308 can each correspond to any of the phycocolloids, additives, and biopolymers disclosed above. For example, (i) the phycocolloid 302 can comprise agar, alginate, carrageenan, unprocessed seaweed, and/or a chemically-modified phycocolloid, (ii) the additive 304 can comprise a slip agent, an anti-block additive, viscosity enhancer, cross linker, odor absorber, thermal stabilizer, an antioxidant, a hydrophilic plasticizer, a hydrophobic plasticizer, glycerin, polyglycerin, polyglyceride fatty acid esters, guar gum, sorbitol, tributyl citrate, cthylene glycol, water, and/or propylene glycol, and (iii) the polymer 308 can include TPS, PCL, PLA, PHA, PEA, PBAT, PBS, and/or PVOH.

The extruder 305 can be a multiple screw (e.g., a twin screw) extruder, single screw extruder, a ram extruder, and/or a mixer, and can be configured to process feed in a continuous or batch manner. The extruder 305 can include a hopper or primary input 311 ("primary input 311") and a barrel portion or secondary input 312 ("secondary input 312") downstream of the primary input 311. As shown in FIG. 3, the extruder 305 can receive the polymer 308 at the primary input 311, and receive each or a combination of the phycocolloid 302 and additive 304 ("combination 303a") at the secondary input 312. The combination 303a and the polymer 308 are mixed within the extruder 310 to produce the seaweed-based composition 313. The seaweed-based composition can comprise any of the seaweed-based compositions described above.

Mixing or extruding the polymer 308 with the combination 303a within the extruder 310 can occur based on thermal degradation temperatures of the polymer 308, phycocolloid 302 and/or additive 304. For example, the phycocolloid 302 and/or some of the additives 304 can have a thermal degradation temperature around 200° C. and a preferred thermal processing temperature range of 90-200° C., and the polymer 308 can have a thermal degradation temperature around 300° C. and a preferred thermal processing temperature range of 200-300° C. As such, in some embodiments, the polymer 308 can be mixed at the primary input 311 at a first temperature (e.g., between 200-300° C.) to form a material blend, which can then be mixed with the phycocolloid 302 and additive 304 at the secondary input 312 at a second temperature (e.g., between 90-200° C.). less than the first temperature. Mixing the phycocolloid 302, additive 304, and polymer 308 in such a manner can provide multiple advantages, as previously described. For example, mixing the polymer 308 at an elevated temperature upstream of the phycocolloid 302 and/or additive 304 can enable the polymer 308 to achieve a desirable polymer viscosity or melt flow rate (e.g., a melt flow index (MFI) of at least 0.01 grams/10 min), which can further enable the polymer 308 to accept (i.e., be mixed with) the phycocolloid 302 and/or additive 304 (e.g., particulate fillers). If the particulate fillers were added to a polymer having a lower viscosity or melt flow rate (e.g., an MFI less than 0.01 grams/10 min), the particulate fillers may not be homogeneously distributed within the polymer, which could undesirably affect the ability of the polymer to be processed downstream (e.g., via film extrusion).

The system 300 can further comprise a high-speed mixer 315 (e.g., a Henschel mixer) that receives each of or a combination of the phycocolloid 302 and the additive 304 ("combination 303b"), mixes the materials together, and produces a mixture 317 that is then provided to the secondary input 312 of the extruder 310. In doing so, the high-speed mixer 315 blends the phycocolloid 202 and additive 204 prior to the extruder 310, which can beneficially produce a more homogenous seaweed-based composition 313 and/or more quickly reach compatible chemistries.

The system 200 can further include a film extruder 320 (e.g., a film extruder) configured to process the seaweed-based composition 313 to produce a flexible film 321, which can take the form of a roll of flexible film and be further processed into other products, such as shopping bags, poly bags, bubble wrap, polymailers, pouches, or wrappers. The film 321 can correspond to any of the films described herein. For example, the film 321 can comprise a thermoplastic flexible film that is transparent, heat-scalable, and/or foldable, and can degrade naturally (e.g., with or without industrial facilities and/or thermal processing) over a relatively short period of time (e.g., less than 45 days, less than 2 months, less than 4 months, less than 6 months, or less than 1 year). For example, in some embodiments, the film 321 product is home compostable, e.g., as defined by Australian standard AS 5810-2010, European standard EN 13432:2000, TUV Austria certification, and/or (BPI) certification, and/or the film 321 may be industrially compostable. The film 321 can have a composition of at least 10% seaweed, at least 20% seaweed, at least 30% seaweed, at least 40% seaweed, at least 50% seaweed, at least 60% seaweed, at least 70% seaweed, at least 80% seaweed, at least 90% seaweed, and/or any percentages therebetween (e.g., 10-90%). Additionally or alternatively, the film 321 can comprise (i) a density of at least 0.5 g/cm$^3$, 1.0 g/cm$^3$, 1.5 g/cm$^3$, or within a range of 0.5-1.5 g/cm$^3$, (ii) a tensile strength (e.g., accordingly to ASTM D882) of at least 10 megapascals (MPa), 15 MPa, 25 MPa, 30 MPa, 35 MPa, 40 MPa, 45 MPa, 50 MPa, or within a range of 10-50 MPa, 30-50 MPa or 35-45 MPa, (iii) a strain at break (e.g., accordingly to ASTM D882) of at least 50%, 60%, 70%, 80%, 90%, 100%, 200%, 300%, 400%, 500%, or within a range of 50-500%, (iv) stiffness or modulus (e.g., according to ASTM D882) of at least 25 MPa, 30 MPa, 50 MPa, 75 MPa, 100 MPa, 125 MPa, 150 MPa, 175 MPa, 200 MPa, 300 MPa or within a range of 25-300 MPa, and/or (v) a moisture vapor transmission rate (WVTR) of no more than 1000 g/m$^2$/day, 500 g/m$^2$/day, 250 g/m$^2$/day, 100 g/m$^2$/day, 50 g/m$^2$/day, 25 g/m$^2$/day, 10 g/m$^2$/day, or within a range of 10-1000 g/m$^2$/day.

Figure 4:
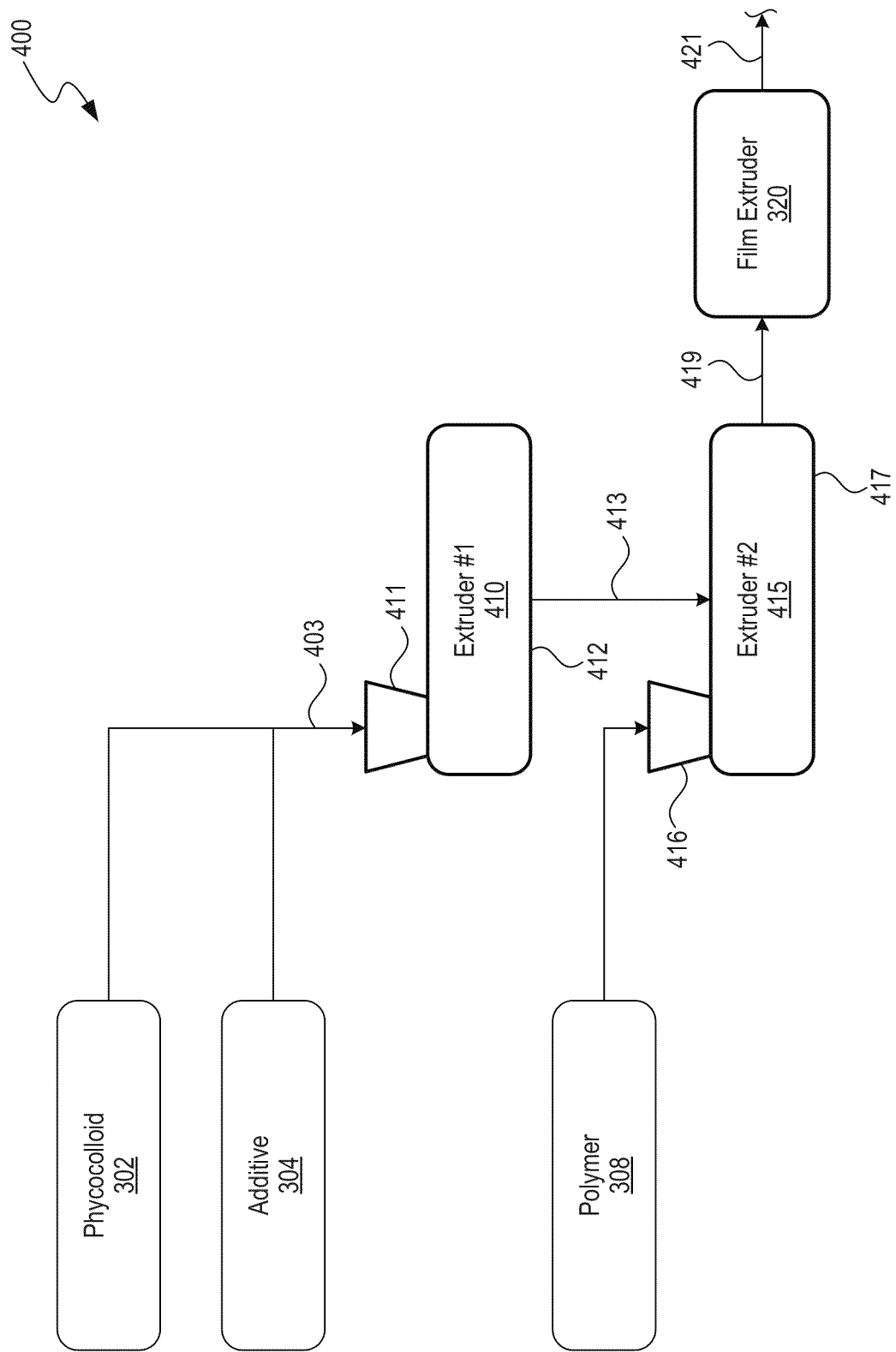

FIG. 4 is a schematic block diagram of a system 400 for producing a seaweed-based composition, in accordance with embodiments of the present technology. The system 400 can include features generally similar to those of the system 300 described with reference to FIG. 3. For example, the system 400 can include the phycocolloid 302, additive 304, polymer 308, and film extruder 320 described with reference to FIG. 3. As shown in FIG. 4, the system 400 can further include a first extruder 410 and a second extruder 415. The first extruder 410 and second extruder 415 can be identical to the extruder 310 described with reference to FIG. 3, or have any of the features described with reference to the extruder 310. As shown in FIG. 4, the first extruder 410 includes a primary input 411 and a secondary input 412, and the second extruder 415 includes a primary input 416 and a secondary input 417. The first extruder 410 is configured to receive each or a combination 403 of the phycocolloid 302 and additive 304 at the primary input 411 to produce a blend 413, which can be similar to the mixture 317 described with reference to FIG. 3. In some embodiments, the blend 413 comprises 20-80% of the polymer 308 (e.g., PBAT), 10-50% of the phycocolloid 302 (e.g., agar), and 10-50% of the additive 304. In some embodiments including unprocessed seaweed, the blend 413 can comprise less than 90% of the polymer 308, 10-90% of the phycocolloid 302, and less than 50% of the additive 304.

The second extruder 415 is configured to receive the blend 413 at the secondary input 417 and the polymer 308 at the primary input 416 to produce a seaweed-based composition or pellet 419 ("seaweed-based composition 419"). The seaweed-based composition 419 can be identical to the seaweed-based composition 313 described with reference to FIG. 3, or have any of the features described with reference to the seaweed-based composition 313. As described above with reference to FIG. 3, mixing or extruding the polymer 308 within the extruder 310 can occur based on thermal degradation temperatures of the polymer 308, phycocolloid 302 and/or additive 304.

The film extruder 320 can process the seaweed-based composition 419 to produce a flexible film 421. The film 421 can be identical to the film 321 described with reference to FIG. 3, or have any of the features described with reference to the film 321.

III. CONCLUSION

It will be apparent to those having skill in the art that changes may be made to the details of the above-described embodiments without departing from the underlying principles of the present disclosure. In some cases, well-known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the terms "comprising," "including," and "having" should be interpreted to mean including at least the recited feature(s) such that any greater number of the same feature and/or additional types of other features are not precluded.

Reference herein to "one embodiment," "an embodiment," "some embodiments," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, shear strength, and other numerical values used in the specification and claims, are to be understood as being modified in all instances by the term "about." Accordingly, unless indicated to the contrary, the numerical parameters set forth in the preceding specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A method for producing a seaweed-based composition, the method comprising:
   mixing seaweed-based compound with one or more film-forming agents to produce a plurality of compostable and/or biodegradable pellets, wherein the seaweed-based compound comprises a hydrocolloid, a phycocolloid, a chemically modified seaweed, unprocessed seaweed and/or a seaweed powder.

2. The method of any one of the clauses herein, wherein the seaweed-based compound is derived from at least one of agar, ulvan, alginate, or carrageenan.

3. The method of any one of the clauses herein, wherein the seaweed-based compound comprises a protein content of at least 0.1%, at least 1%, at least 2%, at least 3%, at least 5%, at least 8%, at least 10%, at least 15%, at least 20%, at least 25%, at least 30%, or at least 40% by weight.

4. The method of any one of the clauses herein, wherein the seaweed-based compound comprises a protein content within a range of 0.1-40%, 0.1-15%, 1-40%, 2-40%, 3-40%, 5-40%, 10-30%, or 15-30% by weight.

5. The method of any one of the clauses herein, wherein the one or more agents comprise at least one of a compostable resin or biopolymer, a plasticizer, a viscosity enhancer, a cross linker, a slip agent, an anti-block additive, an antioxidant or a thermal stabilizer, a processing aid, water, or an odor absorber.

6. The method of any one of the clauses herein, wherein the one or more agents comprise a compostable resin or biopolymer, a plasticizer, and a thermal stabilizer.

7. The method of any one of the clauses herein, wherein the one or more agents comprise a compostable resin or biopolymer including at least one of polycaprolactone (PCL), polylactic acid (PLA), polyhydroxyalkanoates (PHA), polyesteramide (PEA), polybutylene adipate terephthalate (PBAT), polybutylene succinate (PBS), thermoplastic starch (TPS), and/or polyvinyl alcohol (PVOH).

8. The method of any one of the clauses herein, wherein the one or more agents comprise at least one of a hydrophilic plasticizer, a hydrophobic plasticizer, glycerin, polyglycerin, polyglyceride fatty acid esters, guar gum, sorbitol, tributyl citrate, ethylene glycol, water, or propylene glycol.

9. The method of any one of the clauses herein, wherein the one or more agents comprise a viscosity enhancer including at least one of a copolymer of styrene, methyl methacrylate, glycidyl methacrylate, or a terpolymer.

10. The method of any one of the clauses herein, wherein the one or more agents comprise a cross linker including at least one of calcium chloride, calcium cations, or magnesium cations.

11. The method of any one of the clauses herein, wherein the one or more agents comprise at least one of a plant-based slip agent, erucamide, oleamides, oleyl palmitamide, stearyl erucamide, behenamide, stearamide, ethylene bis-oleamide, or ethylene bis-stearamide.

12. The method of any one of the clauses herein, wherein the one or more agents comprise an anti-block additive including at least one of inorganic minerals, calcined kaolin, cristobalite, precipitated silica, diatomaceous earth, mica, talc, calcium carbonate, calcium sulfate (anhydrite), magnesium carbonate, magnesium sulfate, feldspar, titanium dioxide, organic materials, amides, fatty acid amides, fatty acids, salts of fatty acids, or silicones.

13. The method of any one of the clauses herein, wherein the one or more agents comprise an odor absorber including at least one of vanillin, copper chlorophyllin, spearmint, essential oils, or an inorganic antimicrobial additive.

14. The method of any one of the clauses herein, wherein the one or more materials does not include low density polyethylene (LDPE), high density polyethylene (HDPE), polyethylene terephthalate (PET), or polystyrene (PS).

15. The method of any one of the clauses herein, wherein mixing comprises processing the seaweed-based compound and the one or more agents via a twin-screw extruder.

16. The method of any one of the clauses herein, wherein mixing comprises extruding or compounding at a temperature no more than a predetermined thermal degradation temperature of 300° C., 275° C., 250° C., 225° C., or 200° C.

17. The method of any one of the clauses herein, wherein the one or more agents includes a polymer, and wherein mixing comprises (i) mixing the polymer at a temperature no more than a first predetermined temperature to produce a material blend, and (ii) mixing the material blend with the seaweed-based compound at a temperature no more than a second predetermined temperature, the second predetermined temperature being less than the first predetermined temperature.

18. The method of clause 17, wherein the first predetermined temperature is within a range of 200-300° C. and the second predetermined temperature is within a range of 90-200° C.

19. The method of any one of the clauses herein, wherein the one or more agents includes a polymer, and wherein mixing comprises (i) mixing the polymer to produce a material blend having a melt flow rate of at least 0.01 g/10 min, and (ii) mixing the material blend with the seaweed-based compound.

20. The method of any one of the clauses herein, wherein mixing comprises extruding or compounding at a rotational speed of 500-800 revolutions per minute (rpm) for a 0.5-1 inch extruder, 100-1000 rpm for a 1-2 inch extruder, 200-1200 rpm for a 2-3 inch extruder, or 300-1600 RPM for a 3-4 inch extruder.

21. The method of any one of the clauses herein, wherein mixing comprises continuous compounding or reaction extrusion.

22. The method of any one of the clauses herein, wherein the pellets comprise a size of 1-5 mm.

23. The method of any one of the clauses herein, wherein the pellets have a cylindrical or disc shape.

24. The method of any one of the clauses herein, wherein the pellets are configured to be processed via a blown or cast film extruder or blown or cast film extrusion process.

25. The method of any one of the clauses herein, wherein the pellets, when processed across a range of temperatures from 160-180° C., have a melt flow index (MFI) at 160° C. of 1-15 g/10 min, an MFI at 170° C. of 5-20 g/10 min, and an MFI at 180° C. of 10-25 g/10 min, wherein the difference between the MFI at each of these temperatures is less than 5 g/10 min, less than 4 g/min, or less than 3 g/10 min.

26. The method of any one of the clauses herein, wherein the pellets comprise a moisture content less than 50% by weight.

27. The method of any one of the clauses herein, wherein the pellets comprise a polydispersity index (PI) of between 1 and 3, the PI being equal to the ratio of the weight average molecular weight to the number average molecular weight of the pellets.

28 The method of any one of the clauses herein, wherein the pellets are configured to be processed at a temperature of no more 200° C.

29. The method of any one of the clauses herein, further comprising processing the pellets to produce a product.

30. The method of clause 29, wherein processing comprises extruding the pellets via a blown or cast film extruder or blown or cast film extrusion process.

31. The method of clause 29, wherein the product comprises a film that is transparent, heat-sealable, and foldable.

32. The method of clause 29, wherein the product is configured to degrade over a period of no more than 6 months.

33. The method of clause 29, wherein the product, when in a compost environment, is configured to degrade over a period of no more than 1 month, 2 months, 3 months, 4 months, 5 months, or 6 months.

34 The method of clause 29, wherein the product has a composition including at least 20% seaweed, at least 30% seaweed, at least 40% seaweed, at least 50% seaweed, at least 60% seaweed, at least 70% seaweed, at least 80% seaweed, or at least 90% seaweed.

35. The method of clause 29, wherein the product is biodegradable per ISO 14855.

36. The method of any one of the clauses herein, wherein the seaweed-based compound is a chemically modified phycocolloid, the method further comprising treating a raw material comprising seaweed via a polymerization technique to produce the chemically-modified phycocolloid, the polymerization technique including at least one of esterification, polyester grafting, acetylation, hydroxypropylation, or carboxymethylation.

37 The method of any one of the clauses herein, wherein the seaweed-based compound is a chemically modified phycocolloid, the method further comprising treating a raw material comprising seaweed to produce the chemically-modified phycocolloid including an ester functional group and/or polyester functional group.

38 The method of any one of the clauses herein, wherein the seaweed-based compound is a chemically-modified phycocolloid, the method further comprising treating a raw material comprising seaweed to produce the chemically-modified phycocolloid including an acetyl functional group.

39. The method of any one of the clauses herein, wherein the seaweed-based compound is a chemically-modified phycocolloid, the method further comprising treating a raw material comprising seaweed to produce the chemically-modified phycocolloid including an hydroxypropyl functional group.

40 The method of any one of the clauses herein, wherein the seaweed-based compound is a chemically-modified phycocolloid, the method further comprising treating a raw material comprising seaweed to produce the chemically-modified phycocolloid including a carboxymethyl functional group.

41. A composition for manufacturing a seaweed-based composition, the composition comprising:
 a seaweed-based compound comprising a hydrocolloid, a phycocolloid, a chemically modified seaweed, unprocessed seaweed and/or a seaweed powder; and
 one or more film-forming agents.

42. The composition of any one of the clauses herein, wherein the seaweed-based compound is derived from at least one of agar, alginate, or carrageenan.

43 The composition of any one of the clauses herein, wherein the seaweed-based compound comprises a protein content of at least 0.1%, at least 3%, at least 5%, at least 8%, at least 10%, at least 15%, at least 20%, at least 25%, at least 30%, or at least 40% by weight.

44. The composition of any one of the clauses herein, wherein the one or more agents comprise at least one of a compostable resin or biopolymer, a plasticizer, a viscosity enhancer, a cross linker, a slip agent, an anti-block additive, an antioxidant or a thermal stabilizer, a processing aid, or an odor absorber.

45. The composition of any one of the clauses herein, wherein the one or more agents comprise a compostable resin or biopolymer, a plasticizer, and a thermal stabilizer.

46. The composition of any one of the clauses herein, wherein the one or more agents comprise a compostable resin or biopolymer including at least one of polycaprolactone (PCL), polylactic acid (PLA), polyhydroxyalkanoates (PHA), polyesteramide (PEA), polybutylene adipate terephthalate (PBAT), polybutylene succinate (PBS), thermoplastic starch (TPS), or polyvinyl alcohol (PVOH).

47 The composition of any one of the clauses herein, wherein the one or more agents comprise at least one of a hydrophilic plasticizer, a hydrophobic plasticizer, glycerin, polyglycerin, polyglyceride fatty acid esters, guar gum, sorbitol, tributyl citrate, ethylene glycol, water, or propylene glycol.

48. The composition of any one of the clauses herein, wherein the one or more agents comprise a viscosity enhancer including at least one of a copolymer of styrene, methyl methacrylate, glycidyl methacrylate, or a terpolymer.

49. The composition of any one of the clauses herein, wherein the one or more agents comprise a cross linker including at least one of calcium chloride, metal cations, calcium cations, or magnesium cations.

50 The composition of any one of the clauses herein, wherein the one or more agents comprise at least one of a plant-based slip agent, erucamide, oleamides, oleyl palmitamide, stearyl erucamide, behenamide, stearamide, ethylene bis-oleamide, or ethylene bis-stearamide.

51. The composition of any one of the clauses herein, wherein the one or more agents comprise an anti-block additive including at least one of inorganic minerals, calcined kaolin, cristobalite, precipitated silica, diatomaceous earth, mica, talc, calcium carbonate, calcium sulfate (anhydrite), magnesium carbonate, magnesium sulfate, feldspar, titanium dioxide, organic materials, amides, fatty acid amides, fatty acids, salts of fatty acids, or silicones.

52. The composition of any one of the clauses herein, wherein the one or more agents comprise an odor absorber including at least one of vanillin, copper chlorophyllin, spearmint, essential oils, or an inorganic antimicrobial additive.

53. The composition of any one of the clauses herein, wherein the one or more agents do not include low density polyethylene (LDPE), high density polyethylene (HDPE), polyethylene terephthalate (PET), or polystyrene (PS).

54. A system for manufacturing a seaweed-based composition, comprising:
 an extruder configured to (i) receive a composition, and (ii) produce a plurality of pellets from the received composition, wherein the composition is that of any one of clauses 41-53.

55 The system of clause 54, wherein the extruder includes (i) a first input area configured to receive the polymer of the composition and process the polymer below a predetermined degradation temperature of the seaweed-based compound of the composition, and (ii) a second input area downstream of the first input area and configured to receive at least the seaweed-based compound of the composition and the processed polymer to produce the pellets, the second input area being configured to operate below the predetermined degradation temperature.

56. The system of clause 54, wherein the extruder includes (i) a first input area configured to receive the polymer of the composition and process the polymer at a first predetermined temperature, and (ii) a second input area downstream of the first input area and configured to receive at least the seaweed-based compound of the composition and the processed polymer to produce the pellets, the second input area being configured to operate at a second predetermined temperature, wherein the first predetermined temperature is within a range of 200-300° C. and the second predetermined temperature is within a range of 90-200° C.

57. The system of clause 54, wherein the extruder is a one-inch extruder configured to extrude the composition at a rotational speed of 50-800 revolutions per minute (RPM).

58. The system of clause 54, wherein the extruder is a two-inch extruder configured to extrude the composition at a rotational speed of 100-1000 revolutions per minute (RPM).

59. The system of clause 54, wherein the extruder is a three-inch or four-inch extruder and is configured to extrude the composition at a rotational speed 200-1200 revolutions per minute (RPM) or 300-1600 RPM.

60. The system of clause 54, wherein the extruder is a first extruder, the system further comprising a blown or cast film extruder configured to process the pellets to produce a product.

61. The system of clause 54, wherein processing comprises extruding the pellets via a blown or cast film extruder or blown or cast film extrusion process.

62. The system of clause 54, wherein the product comprises a flexible film that is transparent, heat-sealable, and foldable.

63. The system of clause 54, wherein the product is configured to degrade over a period of no more than 6 months.

64. The system of clause 54, wherein the product, when in a compost environment, is configured to degrade over a period of no more than 1 month, 2 months, 3 months, 4 months, 5 months, or 6 months.

65. The system of clause 54, wherein the product has a composition including at least 50% seaweed, at least 60% seaweed, at least 70% seaweed, at least 80% seaweed, or at least 90% seaweed.

66. The system of clause 54, wherein the product is biodegradable per ISO 14855.

67. A seaweed-based composition, comprising:
a phycocolloid comprising agar, alginate, carrageenan, and/or unprocessed seaweed;
a polymer comprising thermoplastic starch (TPS), polycaprolactone (PCL), polylactic acid (PLA), polyhydroxyalkanoates (PHA), polyesteramide (PEA), polybutylene adipate terephthalate (PBAT), polybutylene succinate (PBS), and/or polyvinyl alcohol (PVOH); and
an additive comprising a slip agent, an anti-block additive, viscosity enhancer, cross linker, odor absorber, thermal stabilizer, an antioxidant, a hydrophilic plasticizer, a hydrophobic plasticizer, glycerin, glycerol, polyglycerin, polyglyceride fatty acid esters, guar gum, sorbitol, tributyl citrate, ethylene glycol, water, and/or propylene glycol,
wherein
the phycocolloid comprises no more than 90 wt % of the seaweed-based composition, the polymer comprises no more than 80 wt % of the seaweed-based composition, and the additive comprises no more than 50 wt % of the seaweed-based composition.

68. The seaweed-based composition of clause 67, wherein:
the phycocolloid comprises agar and is 10-50 wt % of the seaweed-based composition, and the polymer comprises PBAT and is 20-80 wt % of the seaweed-based composition.

69. The seaweed-based composition of clause 67 or 68, wherein:
the phycocolloid comprises agar and is 10-50 wt % of the seaweed-based composition, the polymer comprises PBAT and is 20-80 wt % of the seaweed-based composition, and the additive comprises glycerol and/or tributyl citrate and is 0.5-2.0 wt % of the seaweed-based composition.

70. The seaweed-based composition of any one of clause 67-69, wherein the phycocolloid comprises unprocessed seaweed, and wherein the unprocessed seaweed comprises 10-50 wt % of the seaweed-based composition.

71. The seaweed-based composition of any one of clause 67-70, wherein the phycocolloid further comprises a chemically-modified phycocolloid, and wherein the chemically-modified phycocolloid comprises 10-50 wt % of the composition.

72. The seaweed-based composition of clause 71, wherein the chemically-modified phycocolloid comprises an ester functional group, a polyester functional group, an acetyl functional group, a hydroxypropyl functional group, and/or a carboxymethyl functional group.

73. The seaweed-based composition of any one of clause 67-72, wherein the seaweed-based composition is a pellet having a cross-sectional dimension of 1-5 millimeters.

74 The seaweed-based composition of any one of clause 67-73, wherein the seaweed-based composition is a pellet comprising a melt flow index (MFI) at 160° C. of 1-15 g/10 min, an MFI at 170° C. of 5-20 g/10 min, and/or an MFI at 180° C. of 10-25 g/10 min.

75. The seaweed-based composition of any one of clause 67-74, wherein the seaweed-based composition comprises a moisture content of no more than 25 wt %.

76. The seaweed-based composition of any one of clause 67-75, wherein the seaweed-based composition comprises (i) a protein content no more than 15 wt %, (ii) a carbohydrate content of at least 30 wt %, and (iii) a minerals content no more than 40%.

77. The seaweed-based composition of any one of clause 67-76, wherein the seaweed-based composition is configured to be processed to produce a compostable thermoplastic film comprising a melting temperature of no more than 170° C. and/or a tensile strength of at least 10 megapascals.

78. A pellet configured to be processed to produce a thermoplastic film, the pellet comprising:
a phycocolloid comprising unprocessed seaweed; and
a biodegradable polymer comprising thermoplastic starch (TPS), polycaprolactone (PCL), polylactic acid (PLA), polyhydroxyalkanoates (PHA), polyesteramide (PEA), polybutylene adipate terephthalate (PBAT), polybutylene succinate (PBS), and/or polyvinyl alcohol (PVOH),
wherein the pellet is compostable and comprises a protein content of 0.1-15 wt %.

79 The pellet of clause 78, wherein the phycocolloid comprises a first phycocolloid, the pellet further comprising a second phycocolloid including agar, alginate, and/or carrageenan, wherein the first phycocolloid and the second phycocolloid together comprise 10-90 wt % of the pellet.

80. The pellet of clause 79, wherein:
the second phycocolloid comprises agar and is 10-50 wt % of the pellet, and the biodegradable polymer comprises PBAT and is 20-80 wt % of the pellet.

81. The pellet of clause 79, wherein the unprocessed seaweed and the phycocolloid together comprise (i) a protein content of 0.1-25 wt %, (ii) a carbohydrate content of at least 30 wt %, and (iii) a minerals content 0.1-40 wt %.

82. The pellet of any one of any one of clause 78-81, further comprising an additive comprising a slip agent, an anti-block additive, viscosity enhancer, cross linker, odor absorber, thermal stabilizer, an antioxidant, glycerin, polyglycerin, polyglyceride fatty acid esters, guar gum, sorbitol, tributyl citrate, ethylene glycol, water, and/or propylene glycol.

83. A system for producing a seaweed-based composition, the system comprising:
an extruder comprising a primary input and an extrusion barrel downstream of the primary input;
a source of a phycocolloid and an additive; and
a source of a polymer,
wherein the extruder is configured to (i) receive the phycocolloid and the additive at the extrusion barrel, (ii) receive the polymer at the primary input, and (iii) produce a seaweed-based composition configured to be processed to produce a film, and
wherein
the phycocolloid comprises 10-50 wt % of the seaweed-based composition,
the polymer comprises 10-80 wt % of the seaweed-based composition, and
the additive comprises no more than 50 wt % of the seaweed-based composition.

84 The system of clause 83, wherein:
the extruder is a twin-screw extruder,
the phycocolloid comprises unprocessed seaweed, and
the phycocolloid comprises 10-50 wt % of the composition.

85. The system of any clause 83 or 84, wherein:
the extruder is a twin-screw extruder,
the phycocolloid comprises a chemically-modified phycocolloid, and
the chemically-modified phycocolloid comprises 10-50 wt % of the composition.

86. The system of any one of clause 83-85, wherein:
the extruder is a twin screw-extruder,
the system further comprising a high-speed mixer configured to (i) receive the phycocolloid and the additive and (ii) produce a mixture of the phycocolloid and the additive,
the phycocolloid and the additive received at the extrusion barrel of the extruder is the mixture; and
the twin-screw extruder is configured to receive the mixture at the extrusion barrel.

87. The system of any one of clause 83-86, wherein:
the extruder is a second extruder, and
the system further comprises a first extruder configured to (i) receive the phycocolloid and the additive and (ii) produce a blend of the phycocolloid and the additive, and
the second extruder is configured to receive the polymer at the primary input of the second extruder.

88. The system of clause 87, wherein the phycocolloid of the blend comprises unprocessed seaweed, and wherein the unprocessed seaweed comprises 10-50 wt % of the blend.

89. The system of any one of clause 83-88, further comprising a film extruder configured to receive the composition from the extruder and produce a thermoplastic film having a melting temperature of no more than 170° C.

90 The system of clause 89, wherein the film is configured to degrade over a period of no more than 6 months.

91. The system of clause 89, wherein the film comprises:
a tensile strength of at least 10 megapascals (MPa),
a modulus of no more than 30 MPa, and
a strain at break of no more than 50%.

92. A method for producing a seaweed-based composition, the method comprising:
receiving, at an extruder, a phycocolloid and an additive, wherein:
the phycocolloid comprises agar, alginate, carrageenan, and/or unprocessed seaweed, and
the additive comprises a slip agent, an anti-block additive, an antioxidant, glycerin, sorbitol, water, and/or citrate; and
mixing, at the extruder, the phycocolloid, the additive, and a polymer to produce a seaweed-based composition, wherein:
the polymer comprises thermoplastic starch (TPS), polycaprolactone (PCL), polylactic acid (PLA), polyhydroxyalkanoates (PHA), polyesteramide (PEA), polybutylene adipate terephthalate (PBAT), polybutylene succinate (PBS), and/or polyvinyl alcohol (PVOH), and
the seaweed-based composition comprises (i) 10-50 wt % of the phycocolloid, (ii) 10-80 wt % of the polymer, and (iii) 10-50 wt % of the additive.

93. The method of clause 92, wherein the phycocolloid and the additive received at the extruder is a mixture, the method further comprising:
receiving, at a high-speed mixer, the phycocolloid and the additive; and
mixing the phycocolloid and the additive to produce the mixture.

94. The method of clause 92 or 93, wherein mixing the phycocolloid, the additive, and the polymer comprises (i) heating the polymer at a first temperature within a range of 110-300° C. to produce a heated polymer, and (ii) mixing the heated polymer with the phycocolloid and the additive at a second temperature within a range of 90-200° C.

95. The method of any one of clause 92-94, wherein the extruder is a second extruder including a primary input and a secondary input downstream of the primary input, and wherein receiving the phycocolloid and the additive comprises receiving a blend of the phycocolloid and the additive at the secondary input of the second extruder, the method further comprising:
receiving, at the first extruder, the phycocolloid and the additive;
mixing, at the first extruder, the phycocolloid and the additive to produce the blend; and
receiving the polymer at the primary input of the second extruder.

96 The method of any one of clause 92-95, wherein mixing the blend with the polymer comprises extruding or compounding at a rotational speed of 50-800 revolutions per minute (RPM) for a 0.5-1 inch extruder, 100-1000 RPM for a 1-2 inch extruder, 200-1200 RPM for a 2-3 inch extruder, or 300-1600 RPM for a 3-4 inch extruder.

We claim:
1. A system for producing a seaweed-based composition, the system comprising:
an extruder;
a source of a phycocolloid and an additive; and
a source of a polymer,
wherein:
the extruder is configured to (i) receive the phycocolloid, the additive and the polymer, and (ii) produce a seaweed-based composition configured to be processed to produce a flexible film,
the phycocolloid comprises no more than 90 wt % of the seaweed-based composition,
the polymer comprises no more than 80 wt % of the seaweed-based composition, and
the additive comprises no more than 50 wt % of the seaweed-based composition.

2. The system of claim 1, wherein:
the extruder comprises a primary input,
the polymer is received at the primary input of the extruder, and
the phycocolloid and the additive are received at the extruder downstream of the primary input.

3. The system of claim 1, wherein:
the extruder comprises a primary input and an extrusion barrel downstream of the primary input, and
the polymer, the phycocolloid, and the additive are received at the primary input of the extruder.

4. The system of claim 1, further comprising a mixer configured to receive the phycocolloid and the additive and produce a mixture, wherein:
the extruder comprises a primary input and an extrusion barrel downstream of the primary input, and
the polymer and the mixture are received at the primary input of the extruder.

5. The system of claim 1, further comprising a film extruder configured to receive the seaweed-based composition from the extruder and produce a thermoplastic flexible film having a softening temperature of no more than 170° C.

6. The system of claim 5, wherein the film is configured to degrade over a period of no more than 6 months.

7. The system of claim 5, wherein the film comprises:
a tensile strength of at least 5 megapascals (MPa),
a modulus of at least 30 MPa, and
a strain at break of at least 100%.

8. The system of claim 1, wherein a moisture content of the seaweed-based composition is no more than 25 wt %.

9. A system for producing a seaweed-based composition, the system comprising:
an extruder comprising a primary input and an extrusion barrel downstream of the primary input; and
a source of a phycocolloid and an additive;
wherein:
the extruder is configured to (i) receive the phycocolloid and the additive, and (ii) produce a blend,
the phycocolloid comprises 10-90 wt % of the blend, and
the additive comprises no more than 50 wt % of the blend.

10. The system of claim 9, wherein the extruder is a first extruder and the system further comprises a second extruder and a source of a polymer, wherein the second extruder is configured to (i) receive the polymer and the blend, and (ii) produce a seaweed-based composition.

11. The system of claim 10, wherein the second extruder includes a primary input and an extrusion barrel downstream of the primary input, and wherein the polymer is received at the primary input of the second extruder and the blend is received at the extrusion barrel of the second extruder.

12. The system of claim 10, wherein the second extruder includes a primary input and an extrusion barrel downstream of the primary input, and wherein the polymer and the blend are received at the primary input of the second extruder.

13. The system of claim 10, wherein:
the second extruder includes a primary input and an extrusion barrel downstream of the primary input,
the phycocolloid is received at the primary input of the first extruder,
the additive is received at the extrusion barrel of the first extruder,
the polymer is received at the primary input of the second extruder, and
the blend is received at the extrusion barrel of the second extruder.

14. The system of claim 10, wherein:
the second extruder includes a primary input and an extrusion barrel downstream of the primary input,
the phycocolloid is received at the primary input of the first extruder,
the additive is received at the extrusion barrel of the first extruder, and
the polymer and the blend are received at the primary input of the second extruder.

15. The system of claim 10, wherein the polymer comprises 10-80 wt % of the seaweed-based composition.

16. The system of claim 10, wherein:
at least one of the first extruder or the second extruder is a twin-screw extruder,
the phycocolloid comprises unprocessed seaweed, and
the phycocolloid comprises 10-90 wt % of the seaweed-based composition.

17. The system of claim 10, wherein:
at least one of the first extruder or the second extruder is a twin screw-extruder,
the phycocolloid comprises a chemically-modified phycocolloid, and
the chemically-modified phycocolloid comprises 10-50 wt % of the seaweed-based composition.

18. The system of claim 9, wherein a moisture content of the blend is no more than 25 wt %.

19. The system of claim 9, wherein the seaweed-based composition is biodegradable.

20. The system of claim 9, further comprising a mixer configured to (i) receive the phycocolloid and the additive, and (ii) produce a mixture of the phycocolloid and the additive, wherein the mixture is received at the primary input of the extruder.

* * * * *